US010075767B2

(12) United States Patent
Husain et al.

(10) Patent No.: US 10,075,767 B2
(45) Date of Patent: Sep. 11, 2018

(54) BROADCAST CONTENT VIEW ANALYSIS BASED ON AMBIENT AUDIO RECORDING

(71) Applicant: Facebook, Inc., Menlo Park, CA (US)

(72) Inventors: Aliasgar Mumtaz Husain, Milpitas, CA (US); Yali Xu, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/376,515

(22) Filed: Dec. 12, 2016

(65) Prior Publication Data
US 2018/0167677 A1    Jun. 14, 2018

(51) Int. Cl.
*H04N 21/442* (2011.01)
*H04H 60/66* (2008.01)
*H04N 21/439* (2011.01)
*H04N 21/258* (2011.01)

(52) U.S. Cl.
CPC ...... *H04N 21/44218* (2013.01); *H04H 60/66* (2013.01); *H04N 21/25883* (2013.01); *H04N 21/25891* (2013.01); *H04N 21/4394* (2013.01)

(58) Field of Classification Search
None
See application file for complete search history.

(56) References Cited

U.S. PATENT DOCUMENTS

| | | | | |
|---|---|---|---|---|
| 7,316,025 B1 * | 1/2008 | Aijala | ................... | H04H 20/31 725/10 |
| 8,417,096 B2 * | 4/2013 | Gharaat | ............. | G06Q 30/0244 386/249 |
| 9,100,132 B2 * | 8/2015 | Kolessar | ................ | H04H 60/31 |
| 9,516,360 B2 * | 12/2016 | Grokop | .................. | H04N 21/24 |
| 9,668,008 B2 * | 5/2017 | Cho | ................ | H04N 21/25891 |
| 2004/0204943 A1 * | 10/2004 | Kirovski | ............... | G10L 19/018 704/273 |
| 2006/0059277 A1 * | 3/2006 | Zito | ........................ | G06Q 30/02 710/15 |
| 2007/0143778 A1 * | 6/2007 | Covell | .............. | G06F 17/30743 725/19 |
| 2008/0126420 A1 * | 5/2008 | Wright | ................... | H04H 60/64 |
| 2010/0268573 A1 * | 10/2010 | Jain | .................... | G06Q 30/0203 705/7.32 |
| 2011/0106587 A1 * | 5/2011 | Lynch | ................ | G06Q 30/0204 705/7.33 |

(Continued)

*Primary Examiner* — Alexander Q Huerta
(74) *Attorney, Agent, or Firm* — Fenwick & West LLP

(57) ABSTRACT

An online system analyzes broadcast content viewed by individuals in a household. Each individual in the household is associated with a client device on which a software application module is executed. When the software application module detects one or more broadcasting signals of a content item broadcasted to the household, the software application module records the ambient audio, including audio from the broadcasting device. The software application module sends an identifier of the individual associated with the client device, an ambient audio fingerprint derived from the recorded ambient audio, and time information for the recorded ambient audio to the online system. The online system, based on the ambient audio data, identifies the corresponding individual and content item and logs an impression for the content item upon determination that there was an impression of the identified content item by the identified individual.

19 Claims, 8 Drawing Sheets

(56) References Cited

U.S. PATENT DOCUMENTS

| | | | |
|---|---|---|---|
| 2012/0219156 A1* | 8/2012 | Ramaswamy | H04H 60/58 381/56 |
| 2013/0152139 A1* | 6/2013 | Davis | H04N 21/482 725/61 |
| 2013/0160042 A1* | 6/2013 | Stokes | H04N 21/24 725/18 |
| 2014/0142958 A1* | 5/2014 | Sharma | G10L 19/018 704/500 |
| 2015/0365721 A1* | 12/2015 | Nielsen | H04H 60/58 725/18 |
| 2016/0007083 A1* | 1/2016 | Gurha | H04N 21/44222 725/13 |
| 2016/0261917 A1* | 9/2016 | Trollope | G10L 25/51 |
| 2016/0379235 A1* | 12/2016 | Mendrisova | G06Q 30/0204 705/7.33 |

* cited by examiner a content item broadcasted to a household by the broadcasting device. In one embodiment, detecting the broadcasting signals comprises detecting whether the client device is in the vicinity of the broadcasting device. It is noted that when the client device is in the vicinity of the broadcasting device, the individual associated with the client device is very likely to be viewing a content item being displayed on the broadcasting device. Upon detecting the broadcasting signals, the client device records the ambient audio of the content item. The software application module further extracts an audio feature from the recorded ambient audio to generate identifying information about the content item, e.g., an ambient audio fingerprint. The software application module sends a data set, which comprises the ambient audio fingerprint, time information of the recorded ambient audio, and an identifier of the individual, to the online system.

BROADCAST CONTENT VIEW ANALYSIS BASED ON AMBIENT AUDIO RECORDING

BACKGROUND

This disclosure generally relates to broadcast digital content, and more specifically to per user based broadcast content view analysis based on recorded ambient audio of the broadcast content presented to the user.

Content providers produce content that is targeted to certain audiences within online systems. Users interact with content received from the online system. With the advent of online systems such as social networking systems, content providers have increasingly relied on the online systems to create effective sponsored content within the online system to greatly increase engagement among users of the online systems. Content providers have a vested interest in knowing who have listened and/or viewed their content and how many people have listened and/or viewed their content. Content providers have tried many ways to distribute their content to targeted audiences, e.g., TV broadcasting Over the Top (OTT) and Over the Air (OTA). Subsequent to presenting sponsored content provided by a content provider to users over the Internet and/or over TV broadcasting, the content providers want to tracks how often the users interact with the presented content and calculates statistics for the content. These statistics may be accrued over numerous content campaigns and serve to measure the effectiveness of each content item in the campaign. Based on these statistics, the content provider can edit content items that perform poorly or alternatively choose to show content items that have performed very effectively. However, analyzing viewership of broadcast content is challenging. For example, it is challenging to detect whether a viewer who was presented with content over the Internet has actually viewed the content and how long the viewer has viewed the content. It is even harder for acknowledgement of reception of OTA content.

SUMMARY

Described methods, systems and computer program readable storage medium storing executable computer program instructions provide solutions for analyzing view of broadcast content for each user of an online system in a household based on recording of ambient audio of the broadcast content. Ambient audio/sounds refer to distinct and subtle sounds of a particular location created by the environment of the location, such as machinery noise, the sound of distant human movement and speech, creaks from thermal contraction, and air conditioning and plumbing noises in a household. A particular ambient audio/sound can be identified by an ambient audio fingerprint or signature (e.g., a binary code) generated from a subset of the ambient sound, e.g., an audio feature. An example of an audio feature associated with a broadcast sponsored content item includes high frequency modulated voice closer to 20 kHz, which is a non-human hearable digital sound, but machine recognizable set of Morse-style sounds.

One embodiment includes a method for analyzing broadcast content view by individuals in a household based on ambient audio recording. In the embodiment, the household has a broadcasting device that displays broadcast content to the individuals. Each of the individuals is a user of an online system and is associated with a client device where a software application module is executed. The software application module detects one or more broadcasting signals The online system, for each data set received from the software application module, identifies the corresponding individual and content item, and determines whether there was an impression of the identified content item by the identified individual, i.e., whether the identified individual viewed the identified content item. Responsive to determination that there was an impression of the identified content item on the identified individual, the online system logs impression associated with the identified individual and the identified content item. The online system may apply the impression to update user profiles of the individuals, select broadcast content for presenting to the individuals, derive information describing attribution of the content items, or any combination thereof.

The features and advantages described in this summary and the following detailed description are not all-inclusive. Many additional features and advantages will be apparent to one of ordinary skill in the art in view of the drawings, specification, and claims hereof.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview of System Environment

Figure 1A:
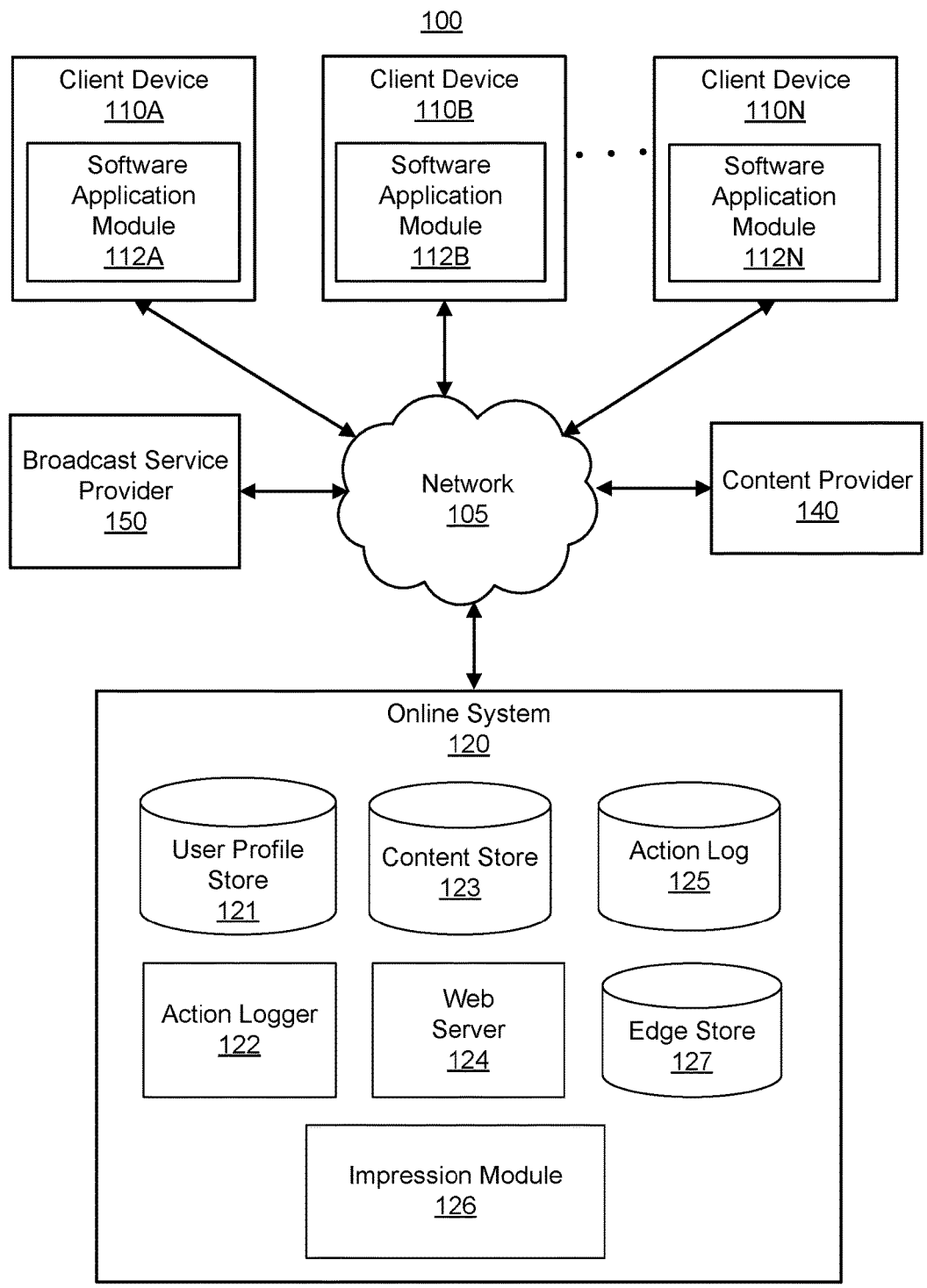
FIG. 1A is a block diagram illustrating a system environment of an online system for view analysis of broadcast content according to one embodiment.

FIG. 1A is a block diagram illustrating a system environment 100 of an online system 120 for view analysis of broadcast content according to one embodiment. As shown, the system environment 100 includes multiple client devices 110A-N, the online system 120, a content provider 140, and a broadcast service provider 150 (also referred to as "broadcaster 150"), which are connected via a network 105. In some embodiments, the system environment 100 has multiple content providers 140 and/or multiple broadcast service providers 150. But in the embodiment shown in FIG. 1A, only one of each of these entities is illustrated for simplicity. Likewise, different and/or additional components may be included in the system environment 100. For example, the online system 120 is a social networking system, a content sharing network, or another system providing content to users.

The client devices 110A-N are computing devices capable of receiving user input as well as transmitting and/or receiving data via the network 105. In one embodiment, a client device 110 a device having computer functionality, such as a personal digital assistant (PDA), a mobile telephone, a smartphone, a smart watch, or another suitable device. Alternatively, a client device 110 may be a conventional computer system, such as a laptop computer. A client device 110 is configured to communicate via the network 105.

A software application module 112 is executed on each client device 110. A user associated with the client device 110 uses the software application module 112 to interact with the online system 120. The software application module 112 records ambient audio and provides data sets derived from the recorded ambient audio to the online system 120 for view analysis of broadcast content. In some other embodiments, a client device 110 executes an application allowing a user of the client device 110 to interact with the online system 120. For example, a client device 110 executes a browser application to enable interaction between the client device 110 and the online system 120 via the network 105. In another embodiment, a client device 110 interacts with the online system 120 through an application programming interface (API) running on a native operating system of the client device 110, such as IOS® or ANDROID™.

The client devices 110A-N are configured to communicate with each other and with the online system 120 via the network 105, which may comprise any combination of local area and/or wide area networks, using both wired and/or wireless communication systems. In one embodiment, the network 105 uses standard communications technologies and/or protocols. For example, the network 105 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 105 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 105 may be represented using any suitable format, such as hypertext markup language (HTML) or extensible markup language (XML). In some embodiments, all or some of the communication links of the network 105 may be encrypted using any suitable technique or techniques.

The content provider 140 interacts with the online system 120 and the broadcaster 150 via the network 105. Examples of interactions include providing content items for broadcasting to households by the broadcaster 150 as well as information related to the content items. For convenience, content from the content provider 140, regardless of its composition, may be referred to herein as one or more "content items," or as "content." In one embodiment, the content provider 140 sends content items directly to the broadcaster 150 for broadcasting. In another embodiment, the content provider sends content items to the online system 120 first and allows the online system 120 to forward the content items to the broadcaster 150. Interactions also include receiving information related to the broadcast content from the online system 120. For example, the online system 120 analyzes broadcast content view by individuals in a household and sends information generated from the view analysis to the content provider 140 for customizing content items for the individuals in the household.

The broadcaster 150 broadcasts content items from the content provider 140 (through the online system 120 or not) to one or more of its broadcast audiences via an electronic mass communication medium. For example, the broadcaster 150 broadcasts content to households in a specified geographic area. The broadcasting can be either Over-The-Air (OTA) or Over-The-Top (OTT) via the network 105.

Figure 1B:
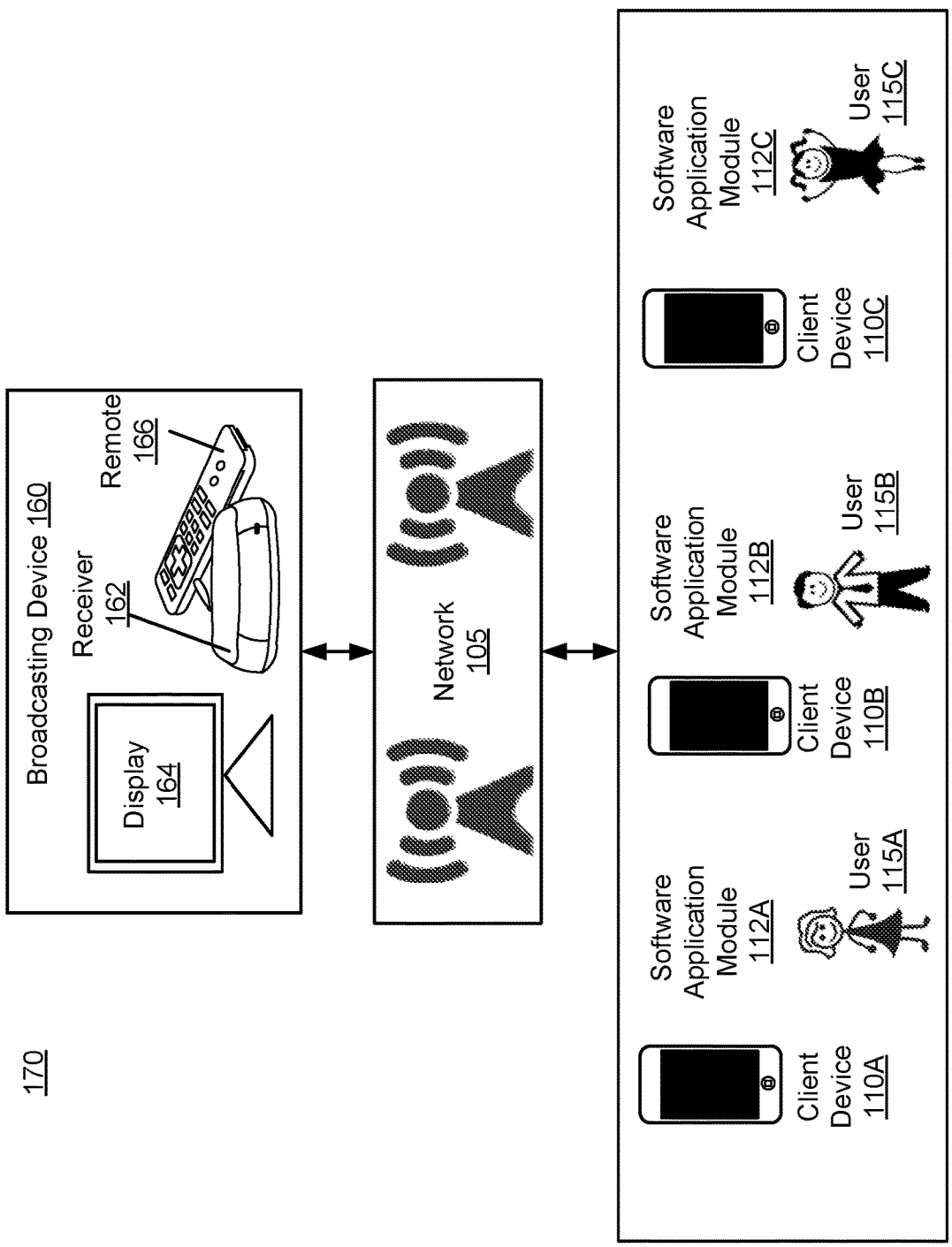
FIG. 1B shows an example of a household comprising a broadcasting device that displays broadcast content to individuals in the household according to one embodiment.

Turning now to FIG. 1B, FIG. 1B shows an example of a household 170 comprising a broadcasting device 160 that displays broadcast content to individuals in the household 170 according to one embodiment. The household 170 has a broadcasting device 160 that displays broadcast content to individuals in the household 170 according to one embodiment. There are three individuals in the household, who are users 115A-C of the online system 120. Each individual, e.g., 115A, is associated with a client device 110, where a software application module 112 is executed. In some embodiments, the household 170 has multiple household devices 160 and/or a different number of individuals. Likewise, different and/or additional parties or devices may be included in the household 170.

In the embodiment shown in FIG. 1B, the broadcasting device 160 receives broadcast content (e.g., a streaming video) embedded with one or more content items (e.g., a TV advertisement from a merchant) from the broadcaster 150 and displays the broadcast content and content items embedded with the broadcast content to one or more of the users 115A-C. In the embodiment of FIG. 1B, the broadcasting device 160 includes a receiver 162, a display 164, and a remote control 166. The receiver 162 communicates with the broadcaster 150 through the network 105 and receives a content item at a pre-determined time. At the same time, the receiver 162 can communication with other broadcasters or broadcast service providers. The receiver 162 can be configured to block certain types of content items. Examples of the receiver 162 include a set-top box, APPLE TV®, XBOX®, etc. The display 164 then displays the content item. An individual/user 115 can use the remote 166 to turn on/off the broadcasting device 160. The user 115 can also use the remote 166 to control the receiver 162 and/or the display 164. For example, the user 115 by using the remote 164 can switch from a channel associated with the broadcaster 150 to a different channel associated with another broadcaster. The user 115 can also fast forward a content item.

In the embodiment of FIG. 1B, the broadcasting device 160 and the client devices 110 A-C are all connected to the network 105. Thus, each client device 110 can communicate with the broadcasting device 160. A communication between a broadcasting device 160 and a client device 110 enables the software application module 112 of the client device 110 to determine whether the client device 110 is in the vicinity of the household device 160. Upon determining that the client device 110 is in the vicinity of a household device 160, the software application module 112 activates the client device 110 to perform actions, such as recording of ambient audio. Ambient audio/sounds in a household refer to distinct and subtle sounds of the household created by the environment of the household, such as machinery noise, the sound of distant human movement and speech, creaks from thermal contraction, and air conditioning and plumbing noises in the household. A particular ambient audio/sound can be identified by a subset of the ambient sound, e.g., an ambient audio fingerprint or signature. An example of an ambient audio signature associated with a sponsored content item broadcast to the household includes high frequency modulated voice closer to 20 kHz at the start of the broadcast content item, which is a non-human hearable digital sound, but machine recognizable set of morse-style sounds representing a binary code.

It is noted that when the client device 110 is in the vicinity of the household device 160, the corresponding user 115 associated with the client device 110 is also in the vicinity of the broadcasting device 160 and is presumed to be viewing the content item being displayed on the broadcasting device 160. Accordingly, the recorded ambient audio includes information related to viewership of the content item by the individuals in the household. The software application module 112 generates a data set based on the recorded ambient audio. The data set includes an identifier for the individual, an ambient audio fingerprint, and time information of the recorded ambient audio. The software application module 112 sends data sets to the online system 120 for analyzing broadcast content view by the individuals in the household. More details about the software application module 112 are discussed in conjunction with FIG. 2.

The online system 120 permits users 115A-C to establish connections (e.g., friendship type relationships, follower type relationships, etc.) with each other and other users of the online system 120. Turning back to FIG. 1A, the online system 120 includes a user profile store 121, a content store 123, an action logger 122, an action log 125, a web server 124, an edge store 127, and an impression module 126. In other embodiments, the online system 120 may include additional, fewer, or different components for various applications. Conventional components such as network interfaces, security functions, load balancers, failover servers, management and network operations consoles, and the like are not shown so as to not obscure the details of the system architecture.

Each user of the online system 120 is associated with a user profile, which is stored in the user profile store 121. A user profile includes declarative information about the user that was explicitly shared by the user and may also include profile information inferred by the online system 120. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 121 may also maintain references to actions by the corresponding user performed on content items in the content store 123 and stored in the action log 125.

While user profiles in the user profile store 121 are frequently associated with individuals, allowing individuals to interact with each other via the online system 120, user profiles may also be stored for entities such as businesses or organizations. This allows an entity to establish a presence on the online system 120 for connecting and exchanging content with other online system users. The entity may post information about itself, about its products or provide other information to users of the online system 120 using a brand page associated with the entity's user profile. Other users of the online system 120 may connect to the brand page to receive information posted to the brand page or to receive information from the brand page. A user profile associated with the brand page may include information about the entity itself, providing users with background or informational data about the entity.

The content store 123 stores information related to broadcast content received from the content provider 140. In some embodiments, the information related to broadcast content includes a topic associated with each content item, the length of time of each content item, each content item itself, or any combination thereof. The content store 123 also stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 123, such as status updates, photos tagged by users to be associated with other objects in the online system 120, events, groups or applications. In some embodiments, objects are received from third-party applications or third-party applications separate from the online system 120. In one embodiment, objects in the content store 123 represent single pieces of content, or content "items." Hence, online system users are encouraged to communicate with each other by posting text and content items of various types of media to the online system 120 through various communication channels. This increases the amount of interaction of users with each other and increases the frequency with which users interact within the online system 120.

The action logger 122 receives communications about user actions internal to and/or external to the online system 120, populating the action log 125 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 125.

The action log 125 may be used by the online system 120 to track user actions on the online system 120. Users may interact with various objects on the online system 120, and information describing these interactions is stored in the action log 125. Examples of interactions with objects include: commenting on posts, sharing links, checking-in to physical locations via a client device 110, accessing content items, and any other suitable interactions. Additional examples of interactions with objects on the online system 120 that are included in the action log 125 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 125 may record a user's interactions with content items on the online system 120 as well as with other applications operating on the online system 120. In some embodiments, data from the action log 125 is used to infer interests or preferences of a user, augmenting the interests included in the user's user profile and allowing a more complete understanding of user preferences.

The edge store 127 stores information describing connections between users and other objects on the online system 120 as edges. Some edges may be defined by users, allowing users to specify their relationships with other users. For example, users may generate edges with other users that parallel the users' real-life relationships, such as family, friends, co-workers, partners, and so forth. In one embodiment, the users 115A-C in the household 170 generate edges specifying that they live in the same household. Other edges are generated when users interact with objects in the online system 120, such as expressing interest in a page on the online system 120, sharing a link with other users of the online system 120, and commenting on posts made by other users of the online system 120.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 120, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 127 also stores information about edges, such as affinity scores for objects, interests, and other users. Affinity scores, or "affinities," may be computed by the online system 120 over time to approximate a user's interest in an object or in another user in the online system 120 based on the actions performed by the user. A user's affinity may be computed by the online system 120 over time to approximate the user's interest in an object, in a topic, or in another user in the online system 120 based on actions performed by the user. Multiple interactions between a user and a specific object may be stored as a single edge in the edge store 129, in one embodiment. Alternatively, each interaction between a user and a specific object is stored as a separate edge. In some embodiments, connections between users may be stored in the user profile store 121, or the user profile store 121 may access the edge store 127 to determine connections between users.

The web server 124 links the online system 120 via the network 105 to the client devices 110, the content provider 140, and the broadcaster 150. The web server 124 serves web pages, as well as other content, such as JAVA®, FLASH®, XML and so forth. A user may send a request to the web server 124 to upload information (e.g., images or videos) that are stored in the content store 123. Similarly, the content provider 140 and/or the broadcaster 150 may send a request to the web server 124 to upload content items and information related to content items that are stored in the content store 123. The web server 124 may also receive and route messages between the online system 120 and the client devices 110, for example, instant messages, queued messages (e.g., email), text messages, short message service (SMS) messages, or messages sent using any other suitable messaging technique. Additionally, the web server 124 may provide application programming interface (API) functionality to send data directly to native client device operating systems, such as IOS®, ANDROID™, or BlackberryOS.

The impression module 126 analyzes broadcast content impression for the individuals in a household based on data sets received from the client devices associated with the individuals in the household. The impression module 126 analyzes a data set of a content item broadcast to an individual in a household to identify the individual. Further, the impression module 126 analyzes the data set to determine whether there was an impression of the content item by the identified individual. If there was an impression of the content item by the identified individual, the impression module 126 logs an impression for the identified individual. Accordingly, the impression module 126 logs the impression for each content item broadcasted to the household. In some embodiments, the impression module 126 customizes content items for identified individuals in the household based on the generated view count. In some other embodiments, the impression module 126 may apply the impression to update user profiles of the individuals, select broadcast content for presenting to the individuals, derive information describing attribution of the content items, or any combination thereof. More details about the impression module 126 are discussed in conjunction with FIG. 3.

Determining Viewership of Content Items

Figure 2:
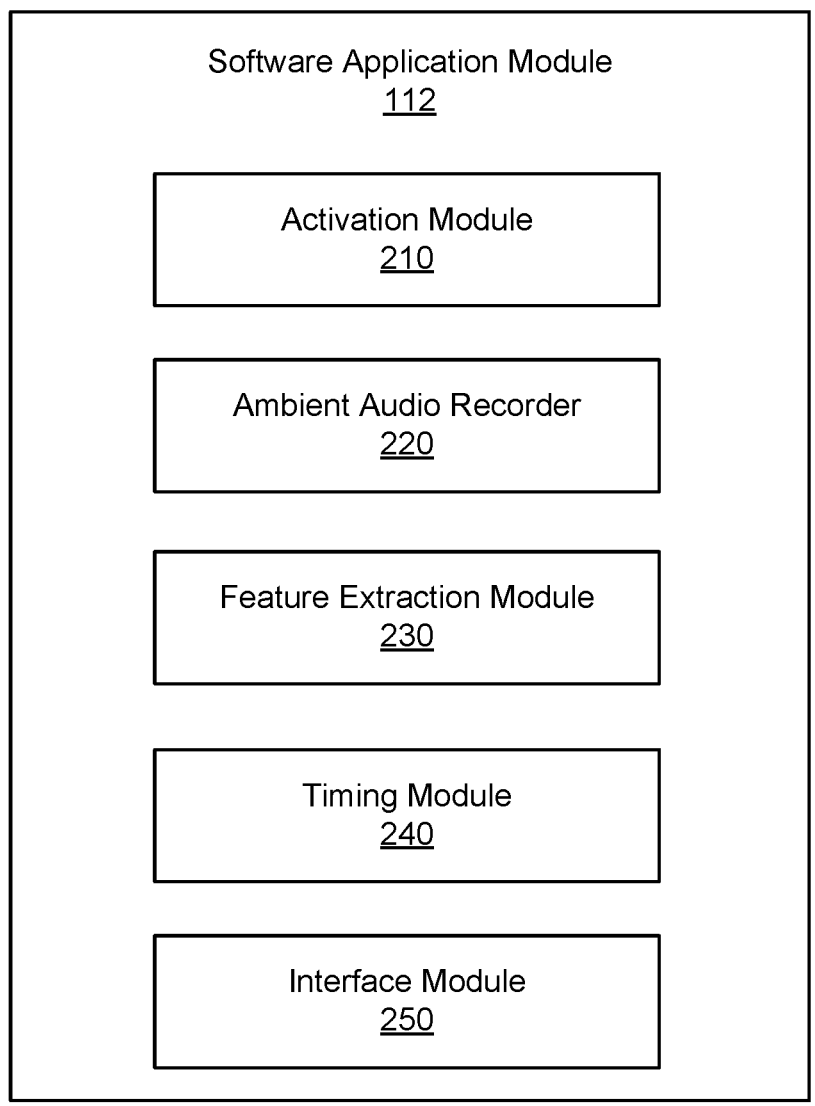
FIG. 2 is a block diagram illustrating a detailed view of a software application module of a client device according to one embodiment.

FIG. 2 is a block diagram illustrating a detailed view of a software application module 112 of a client device 110 according to one embodiment. As shown in FIG. 2, the software application module 112 includes an activation module 210, an ambient audio recorder 220, a feature extraction module 230, a timing module 240, and an interface module 250. Other embodiments of the software application module 112 may include additional or different modules.

The activation module 210 activates the ambient audio recorder 220 upon detecting one or more broadcasting signals of a content item broadcasted to a household. In one embodiment, the activation module 210 determines whether the client device 110 is in the vicinity of a household broadcasting device such as the broadcasting device 160 shown in FIG. 1B, in order to detect the broadcasting signals. The client device 110 communicates with the household device 160. For example, the client device and the household device are both connected to the network 105. The activation module 210 can recognize a unique identifier associated with the broadcasting device 160 through the network 105 and determines that the client device 110 is in the vicinity of a broadcasting device 160 upon recognition of the unique identifier. Examples of the unique identifier of a household device include a device universally unique identifier (UUID), a public Internet Protocol address (IP address), private IP address, a media access control address (MAC address), or any other suitable identifier identifying the broadcasting device 160 when participating in communications via the network 105.

For another example, the client device 110 is coupled to the broadcasting device 160 through short-range wireless communication technology, such as Bluetooth, infrared transmission, etc. The activation module 210 determines that the client device 110 is in the vicinity of the broadcasting device 160 once the client device 110 connects to the household 160. The activation module 210 may require permission from a user 115 associated with the client device 110 to connect the client device 110 to the broadcasting device 160 prior to the connection. In some embodiments, the activation module 210 deactivates the ambient audio recorder 220 by determining that the client device 110 is out of the vicinity of the broadcasting device 160.

The ambient audio recorder 220 starts to record ambient audio once it is activated by the activation module 210. When the client device 110 is in the vicinity of the household device 160, the user 115 is very likely to be viewing a content item being displayed on the broadcasting device 160. Accordingly, the recorded ambient audio includes audio for the part of the content item that is viewed by the user 115. In embodiments where the activation module 210 deactivates the ambient audio recorder 220 by determining that the client device 110 is out of the vicinity of a household device 160, the ambient audio recorder 220 stops recording once it is deactivated by the activation module 210. In some embodiments, the ambient audio recorder 220 automatically stops recording after a pre-determined amount of time. The pre-determined amount of time can be one minute, three minutes, etc. The ambient audio recorder 220 may not need activation to start recording ambient audio. In one embodiment, the online system 120 causes the ambient audio recorder 220 to record ambient audio.

The feature extraction module 230 extracts an audio feature from the recorded ambient audio to generate an ambient audio fingerprint. In one embodiment, an audio feature is a high frequency modulated sound at the beginning of a content item that is inaudible to human being. For example, the audio feature is a set of Morse-style sound having a frequency of approximately 20 k Hz. The audio feature can be short, such as one second or ten seconds. Audio features of different households may vary due to differences in the environment of the households. Each audio feature represents an ambient audio fingerprint associated with the content item broadcast to the household and therefore, can be used to identify the content item. An audio feature comprises one or more discrete audio frames, each of which corresponds to a fragment of the audio feature at a particular time. Hence, each audio frame corresponds to a length of time of the audio feature, such as 25 ms, 50 ms, 100 ms, 200 ms, etc. In some embodiments, the feature extraction module 230 generates the ambient audio fingerprint from one or more of the audio frames of the audio feature. In one embodiment, the feature extraction module 230 preprocesses the audio feature, transforms the audio feature from one domain to another domain, filters the transformed audio feature and generates the ambient audio fingerprint from the further transformed audio feature. One example of the generation of the ambient audio fingerprint is discrete cosine transform (DCT) based audio fingerprint generation. In alternative embodiments, the feature extraction module 220 is included in the impression module 126.

The timing module 240 generates time information of the recorded ambient audio. Time information includes the length of time of the recorded ambient audio. In some embodiments, the time information generated by the timing module 240 includes a start time and/or end time of the recorded ambient audio. The timing information helps the impression module 126 to determine whether an identified individual in a household has reviewed the content item broadcast to the household. For example, for a 30-second advertisement broadcast to the household, if the timing information associated with the identified user indicates a 10-second ambient audio was recorded by the individual's client device, the impression module 126 determines that the identified individual has viewed the advertisement.

The interface module 250 sends data sets related to broadcast content provided to the household 170 to the online system 120. Each data set includes an identifier for a user 115, an ambient audio fingerprint generated by the feature extraction module 230, and time information generated by the timing module 240. In some embodiments, the interface module 250 also sends the recorded ambient audio itself to the online system 120.

Figure 3:
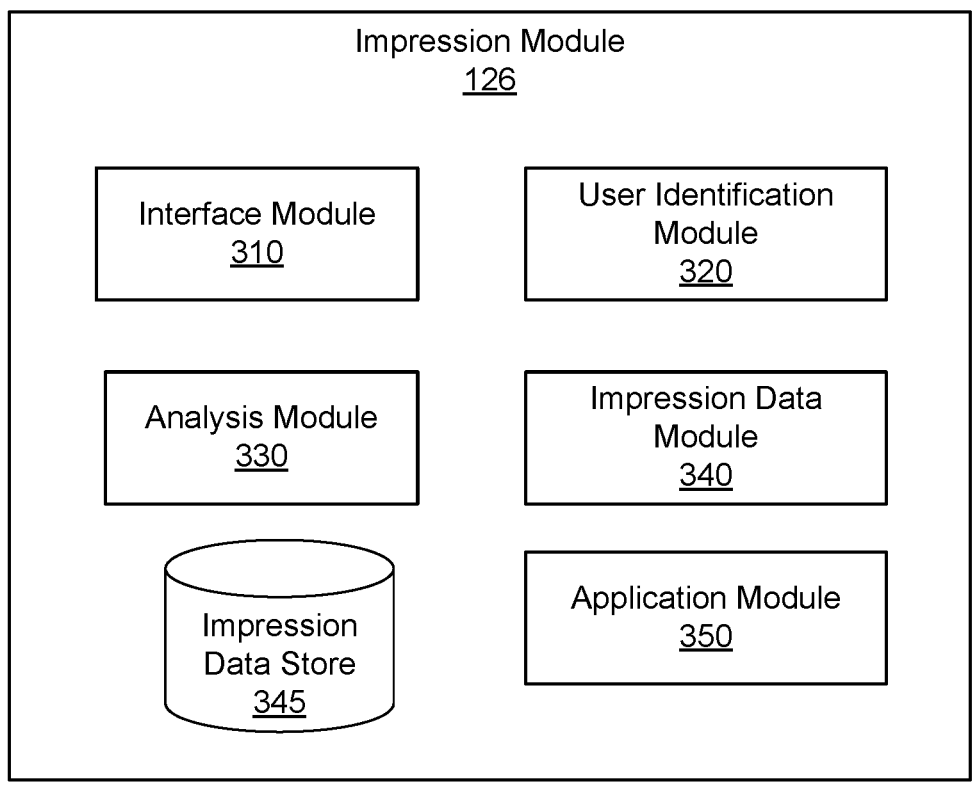
FIG. 3 is a block diagram illustrating a detailed view of an impression module of the online system according to one embodiment.

FIG. 3 is a block diagram illustrating a detailed view of an impression module 126 of the online system 120 according to one embodiment. As shown in FIG. 3, the impression module 126 comprises an interface module 310, a user identification module 320, an analysis module 330, an impression data module 340, an impression data store 345, and an application module 350. Other embodiments of the impression module 126 may include additional or different modules.

The interface module 310 receives data sets related to broadcast content provided to a household 170. The data sets are received from the software application module 112 of the client devices in the household 170. The interface module 310 sends each data set to the user identification module 320, the analysis module 330, and the impression data module 340 for analyzing information included in the data set.

The user identification module 320 identifies an individual based on the identifier in each received data set. Based on the identifier, the user identification module 320 can also match the identified individual with a user of the online system and access the user profile of the user from the user profile store 121. The user profile includes the individual's biographic information, demographic information, or other types of descriptive information, which can be used to customize content items presented to the user.

The analysis module 330 analyzes the ambient audio fingerprint in each received data set to identify the content item associated with the ambient audio fingerprint. The analysis module 330 determines whether there was an impression of the identified content item by the identified individual based on the time information in the data set. In some embodiments, it is determined that there was an impression of the identified content item by the identified individual if the time information indicates that the length of time of the recorded ambient audio is longer than a threshold length of time. The threshold length of time can be universal to all broadcast content or customized to each content item. For example, the threshold length of time for all broadcast content is 10 second. For another example, the threshold length of time for a content item is equal to 30% of the total length of time of the content time. In one embodiment, it is determined that there was an impression of the content item as long as the analysis module 330 detects the ambient audio fingerprint in the data set.

In some embodiments, the analysis module 330 determines other types of activities by the identified individuals in the household 170 with respect to broadcast content. For example, by comparing the length of time of a recorded ambient audio with the length of time of the corresponding content item, the analysis module 330 determines whether the identified individual fast forwarded the content item. For another example, when the length of time of recorded ambient audio for all individuals in the household 170 is 0 second or substantially close to 0 second, the analysis module 330 may determine that the broadcasting device 160 blocks the corresponding content item.

The impression data module 340 logs impressions associated with the identified individuals and the identified content items, i.e., per user impression data. The per user impression data indicates whether a content item has made an impression on a corresponding individual in a household 170. In one embodiment, the impression data module 340 logs impression data for an individual even if the corresponding data set indicates that there is no impression. The content provider 140 may be interested in such impression data because the impression data shows the individual's lack of interest in the content item. The impression data are stored in the impression data store 345.

The application module 350 applies impressions logged by the impression data module 340 in various ways. In one embodiment, the application module 350 matches each individual identified in a data set with a user of the online system 120. As discussed above in conjunction with FIG. 1, the user has a user profile describing one or more demographic attributes of the user, which is stored in the user profile store 121 of the online system 120. The application module 350 may update the user profile of the user based on the logged impression data for the identified individual, responsive to the match. In another embodiment, the application module 350 applies the impression data associated with an individual in the household 170 to derive information describing the individual's interest in content items. The application module 350 can further select one or more content items for the individual based on the analysis of the impression data and present the selected content items for the individuals.

In some embodiments, the application module 350 aggregates the impression data associated with the individuals in the household 170 with impression data of one or more other users of the online system 120. For example, the application module 350 identifies the one or more other users who are connected with the individual in the online system 120. Alternatively, the application module 350 may identify the one or more other users whose user profiles at least in part match the user profile of the individual. For example, the user profiles of those other users include a demographic attribute similar to a demographic attribute included in the user profile of the individual. The application module 350 can further select one or more content items for the individual based on the aggregation of the impression data.

Also, the application module 350 may apply impression data logged by the impression data module 340 to derive information describing attribution of the content items based on the analysis. The attribution of the content items indicates whether the individuals are interested in the content items. For example, if the impression data for a content item is higher than a threshold impression value, the application module 350 determines that the individuals in the household 170 are interested in the content item. Accordingly, the interface module 310 sends an instruction to the content provider 140 (and/or the broadcaster 150) to increase broadcasting frequency of the content item or to broadcast similar content items to the household 170. For another example, if the impression data for a content item is less than a threshold impression value, the application module 350 determines that the content item is not interesting to the individuals in the household 170 and therefore does not worth promoting such content item, e.g., stopping the broadcasting of the content item to the household 170. The interface module 310 may send an instruction to the content provider 140 and/or the broadcaster 150 to stop broadcasting the content item.

In one embodiment, the application module 350 customizes information in broadcast content for the identified individuals in the household 170 based on user profiles of the identified individuals. For example, when descriptive information in user profiles of the identified individuals indicate that the household 170 is located in a particular area, the application module 350 customizes phone numbers, addresses or other geographical information in the broadcast view content to the particular area. The application module 350 can also send impression data to the content provider 140 for the content provider 140 customizing broadcast content for the identified individuals in the household 170.

Broadcast Content View Analysis Based on Audio Recording

Figure 4:
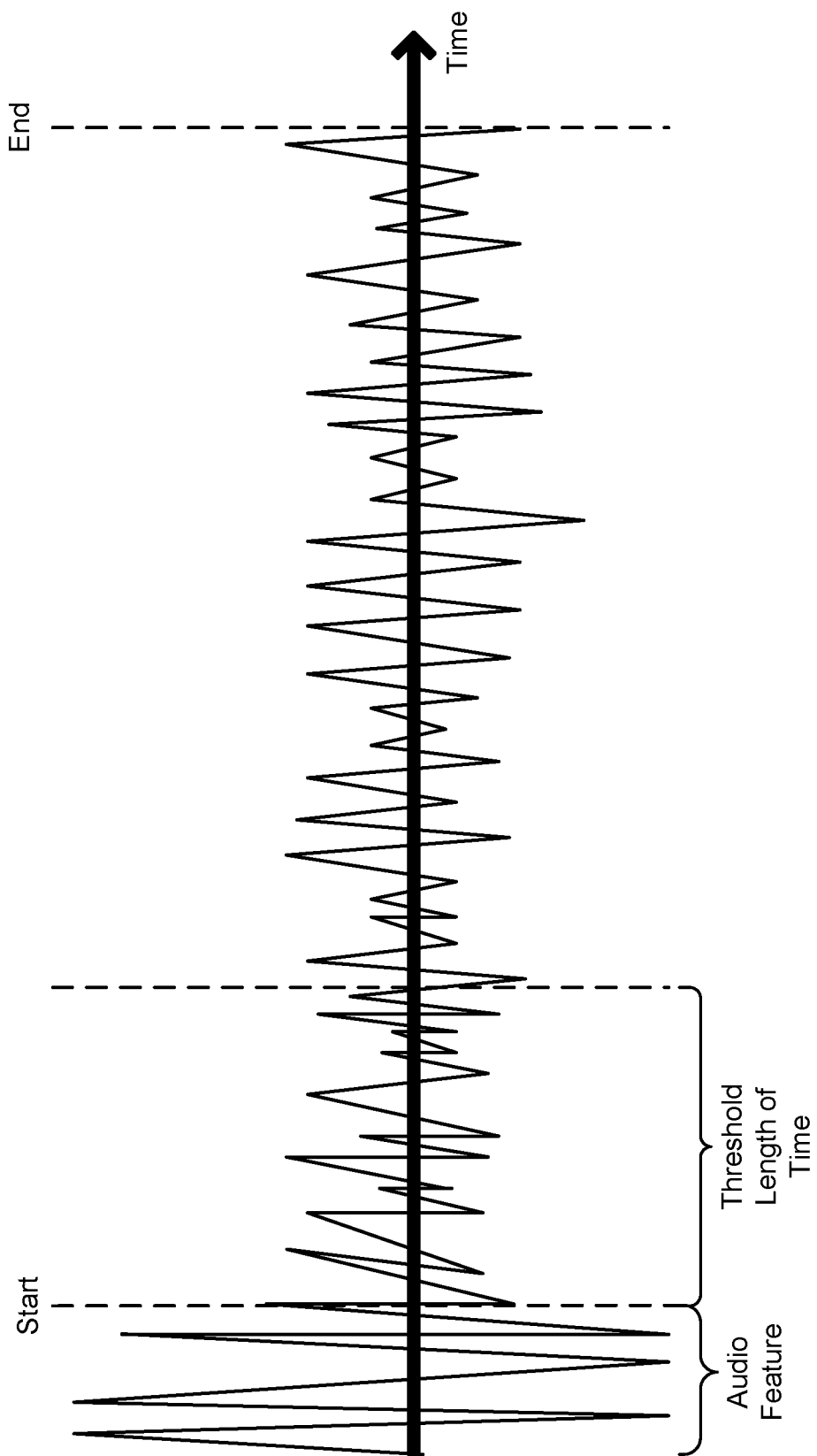
FIG. 4 shows an example of ambient audio recorded by the software application module of a client device according to one embodiment.

FIG. 4 shows an example of ambient audio recorded by the software application module 112 of a client device 110 according to one embodiment. The amplitude represents the frequency of the audio signal at a specific time. As shown in FIG. 4, the beginning of the recorded ambient audio is an audio feature, followed by audible sound. The frequency of the audio feature is much higher than the frequency of the audio of the content item. In some embodiments, the frequency of the audio feature is closer to 20 kHz. Because of the high frequency, the audio feature is inaudible to human being but is recognizable by machine. The audio feature starts from the very beginning of the recorded ambient audio and ends at the start time for the audible sound. The length of time of the audio feature can be pre-determined, e.g., 0.1 second or 1 second.

The audible sound starts right after the audio feature and lasts till the end of the recorded ambient audio. In the embodiment of FIG. 4, the audible sound includes audio of the whole content item being broadcasted on the broadcasting device 160. In other embodiments, a recorded ambient audio may include audio of part of the corresponding content item. A threshold length of time is pre-determined, as shown in FIG. 4. It is noted that there is a view of the content item if a recorded ambient audio is longer than the threshold time. In some embodiments, when the length of time from the start to the end is shorter than the length of time of the content item, it is considered that the user 115 fast forwarded the content item. The length of time from the start to the end may be 0; and in that case, it is considered that the user 115 skipped the content item, e.g., by installing a blocker on the broadcasting device 160.

Figure 5:
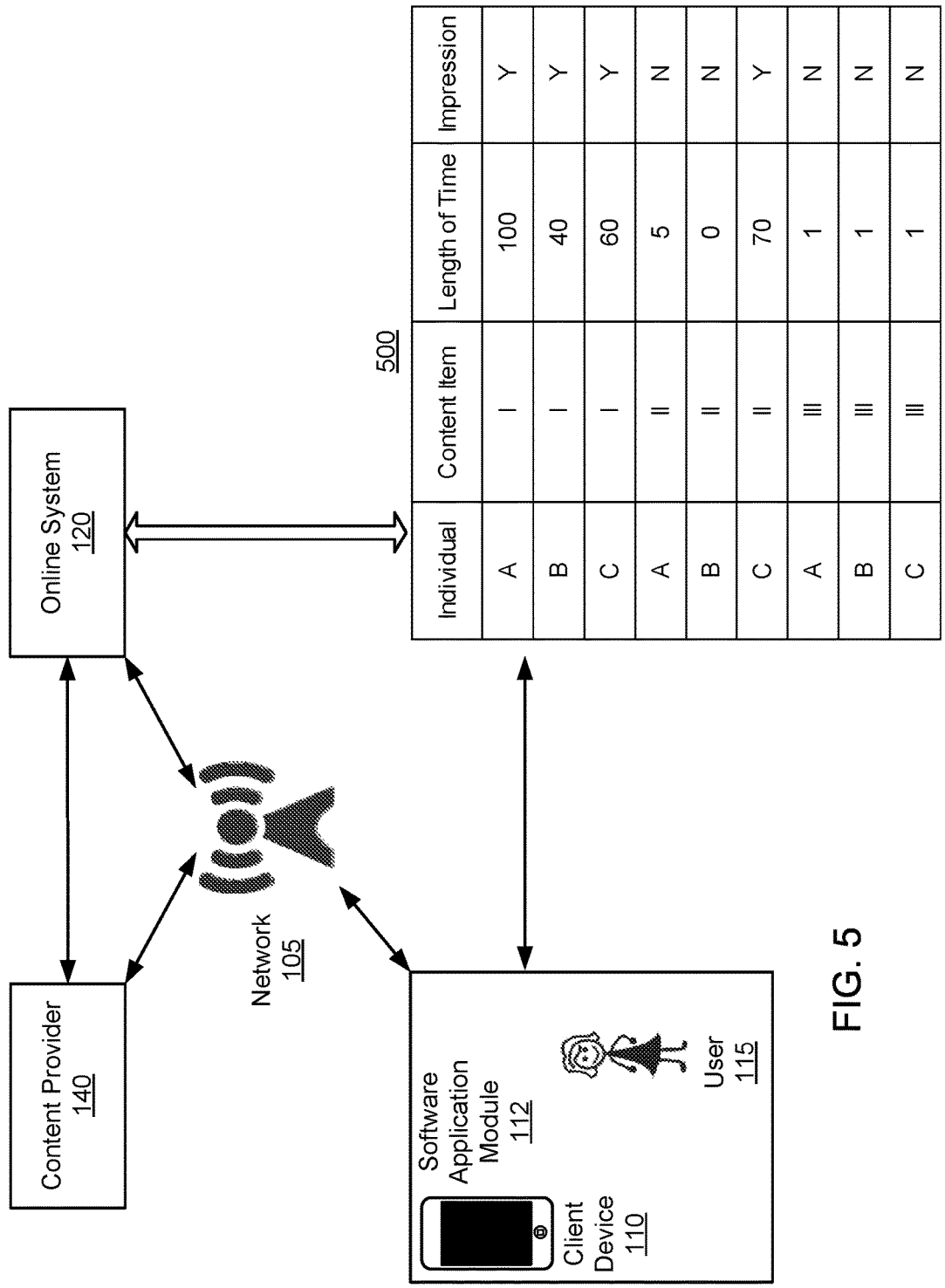
FIG. 5 shows an example of broadcast content view analysis by the online system for the individuals in the household according to one embodiment.

FIG. 5 shows an example of broadcast content view analysis by the online system 120 for the individuals in the household 170 according to one embodiment. FIG. 5 includes the content provider 140, the online system 120, the network 105, and three individuals in the household 170. Each individual is associated with a client device 110, where a software application module 112 is executed. In the embodiment of FIG. 5, the content provider 140 provides three content items, I, II and III, for broadcasting to the household 170. The client devices 110A-C detects broadcasting signals (not shown in FIG. 5) during broadcasting of each content item. Thus, there are three recorded ambient audio for each content item and nine recorded ambient audio in total. The audio feature of each recorded ambient audio has the length of time of one second.

The software application module 112 of each client device 110 sends out three data sets, each data set corresponding to one content item. Thus, the online system 120 receives nine data sets in total. The online system 120 determines that there was an impression of a content item if the length of the recorded ambient audio exceeds 10 seconds, and logs impression data for each content item accordingly. Information related to the impression data are listed in 500.

As shown in 500, the ambient audio recorded by the software application module 112A associated with individual A has a length of time of 100 seconds, versus 40 seconds for individual B and 60 seconds for individual C. Because all three recorded ambient audio are longer than 10 seconds, the online system 120 determines that there are three impressions of content item I. Using the similar method, the online system 120 determines that only individual C viewed content item II but the users 115A-B did not view content item II. Thus, there is only one impression of content item II. For content item III, because none of the recorded ambient audio is longer than 10 second, the online system 120 determines that there is no impression of content item III. Also, because the lengths of the three recorded ambient audio are all one second, which is the length of the audio feature, it is likely that the content items are blocked by the broadcasting device 160.

Figure 6:
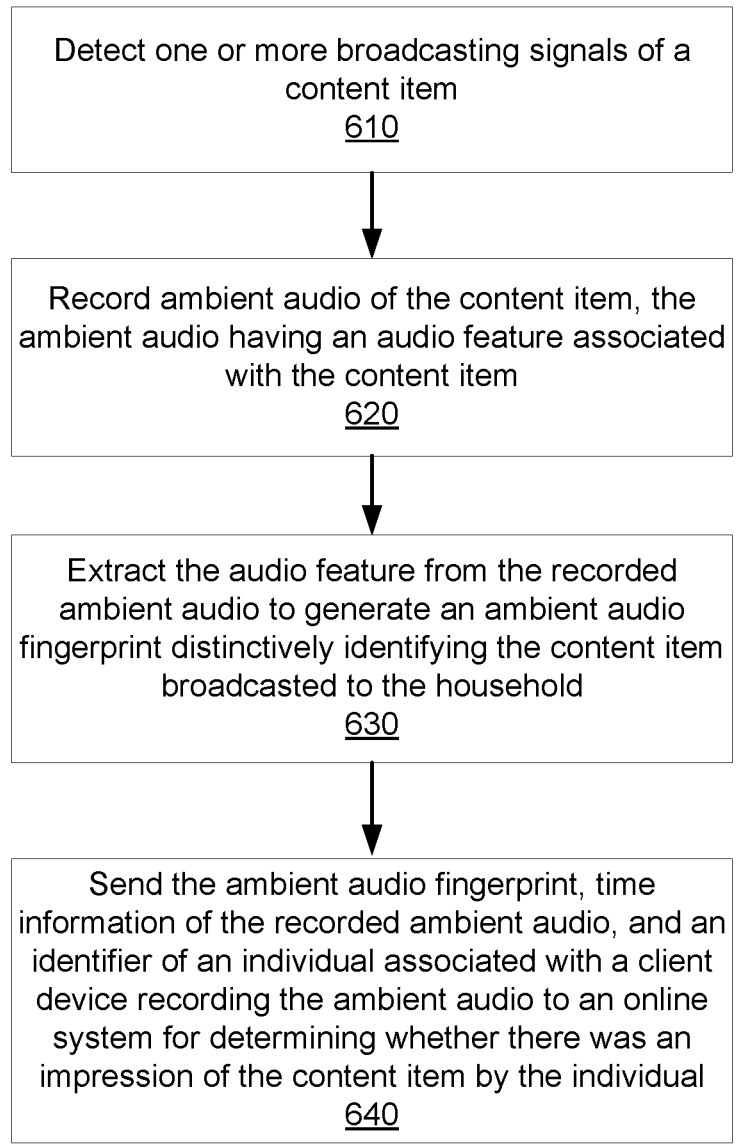
FIG. 6 is a flowchart illustrating a process for enabling view analysis of broadcast content at a client device according to one embodiment.

FIG. 6 is a flowchart illustrating a process for enabling view analysis of broadcast content at a client device 110 according to one embodiment. In some embodiments, the process is performed by the software application module 112 of a client device 110, although some or all of the operations in the method may be performed by other entities in other embodiments. In some embodiments, the operations in the flow chart are performed in a different order and can include different and/or additional steps.

The software application module 112 detects 610 one or more broadcasting signals of a content item. In one embodiment, the software application module 112 determines whether the client device 110 is in the vicinity of a broadcasting device 160 broadcasting the content item. The software application module 112 records 620 ambient audio of the content item, the ambient audio having an audio feature associated with the content item. The software application module 112 may activate recording of the ambient audio upon detection of the broadcasting signals.

The software application module 112 extracts 630 the audio feature from the recorded ambient audio to generate an ambient audio fingerprint distinctively identifying the content item broadcasted to the household 170. The software application module 112 sends 640 the ambient audio fingerprint, time information of the recorded ambient audio, and an identifier of an individual associated with a client device recording the ambient audio to an online system 120 for determining whether there was an impression of the content item by the individual.

Figure 7:
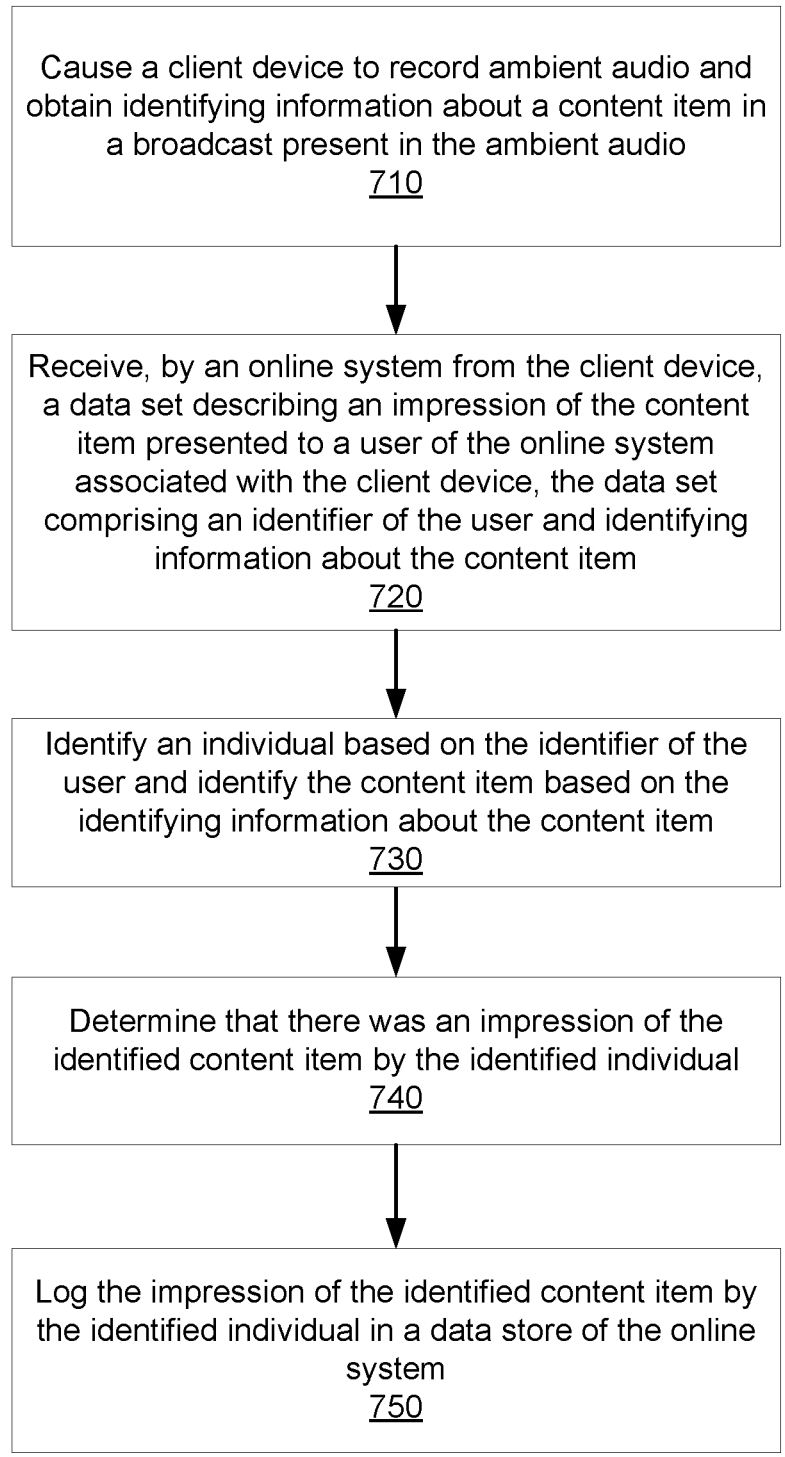
FIG. 7 is flowchart illustrating a process for view analysis of broadcast content by the online system according to one embodiment.

FIG. 7 is flowchart illustrating a process for analyzing broadcast content view by the online system 120 according to one embodiment. In some embodiments, the process is performed by the impression module 126 of the online system 120, although some or all of the operations in the method may be performed by other entities in other embodiments. In some embodiments, the operations in the flow chart are performed in a different order and can include different and/or additional steps.

The impression module 126 causes 710 a client device 110 to record ambient audio and obtain identifying information about a content item in a broadcast present in the ambient audio. The impression module 126 receives 720, from the client device 110, a data set describing an impression of the content item presented to a user of the online system associated with the client device, the data set comprising an identifier of the user and identifying information about the content item. Based on the identifier of the user, the impression module 126 identifies 730 an individual. Also, the impression module 126 identifies 730 the content item based on the identifying information about the content item. The impression module 126 determines 740 that there was an impression of the identified content item by the identified individual. The impression module 126 further logs the impression of the identified content item by the identified individual in a data store of the online system, e.g., the impression data store 345. The online system 120 may apply the logged impression to update a user profile of the individual, select broadcast content for presenting to the individual, derive information describing attribution of the content items, or any combination thereof.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
receiving, by an online system from a client device, a data set comprising an identifier of an individual associated with the client device, an ambient audio fingerprint representing ambient audio captured by the client device during a broadcast by a household device in a vicinity of the client device, and time information indicating a length of time of the ambient audio captured by the client device;
identifying a user profile associated with the online system based on the identifier of the individual received from the client device;
identifying a content item associated with the broadcast based on the ambient audio fingerprint;
determining that there was an impression of the identified content item by the identified user associated with the client device in response to the length of time of the ambient audio exceeding a detection threshold;
logging the impression of the identified content item in association with the user profile in a data store of the online system;
determining if impression data in the data store exceeds a threshold impression value; and
responsive to determining that the impression data in the data store exceeds the threshold impression value, sending an instruction to a content provider to increase broadcasting frequency of the content item on the household device.

2. The method of claim 1, wherein the audio feature is high frequency sound that is inaudible to human being and is located at the beginning of the recorded ambient audio.

3. The method of claim 1, further comprising:
updating the user profile based on the logged impression for the individual identified in the data set.

4. The method of claim 1, further comprising:
applying the impression associated with the individual to derive information describing the individual's interest in content items;
selecting one or more content items for the individual based on the analysis of the impression; and
presenting the selected content items to the individual.

5. The method of claim 1, further comprising:
aggregating the impression associated with the individual with impressions of one or more other users of the online system; and
selecting one or more content items for the individual based on the aggregation of the impression; and
providing, by the online system, the selected one or more content items for display to the client device associated with the user.

6. The method of claim 5, wherein aggregating the impression comprises:
identifying the one or more other users of the online system, wherein the one or more other users are connected with the individual in the online system.

7. The method of claim 5, wherein aggregating the impression comprises:
identifying the one or more other users of the online system, wherein the user profiles of the one or more other users at least in part match the user profile of the individual.

8. The method of claim 1, further comprising:
applying the impression associated with the individual to derive information describing attribution of the content item based on the analysis, wherein the attribution of the content items indicates whether the individual is interested in the content item.

9. A computer program product comprising a non-transitory computer readable storage medium having instructions encoded thereon that, when executed by a processor, cause the processor to perform steps including:
receiving, by an online system from a client device, a data set comprising an identifier of an individual associated with the client device, an ambient audio fingerprint representing ambient audio captured by the client device during a broadcast by a household device in a vicinity of the client device, and time information indicating a length of time of the ambient audio captured by the client device;
identifying a user profile associated with the online system based on the identifier of the individual received from the client device;
identifying a content item associated with the broadcast based on the ambient audio fingerprint;
determining that there was an impression of the identified content item by the identified user associated with the client device in response to the length of time of the ambient audio exceeding a detection threshold;
logging the impression of the identified content item in association with the user profile in a data store of the online system;
determining if impression data in the data store exceeds a threshold impression value; and
responsive to determining that the impression data in the data store exceeds the threshold impression value, sending an instruction to a content provider to increase broadcasting frequency of the content item on the household device.

10. The computer program product of claim 9, wherein the audio feature is high frequency sound that is inaudible to human being and is located at the beginning of the recorded ambient audio.

11. The computer program product of claim 9, further comprising instructions for:
updating the user profile based on the logged impression for the individual identified in the data set.

12. The computer program product of claim 9, further comprising instructions for:

applying the impression associated with the individual to derive information describing the individual's interest in content items;

selecting one or more content items for the individual based on the analysis of the impression; and presenting the selected content items to the individual.

13. The computer program product of claim 9, further comprising instructions for:

aggregating the impression associated with the individual with impressions of one or more other users of the online system; and selecting one or more content items for the individual based on the aggregation of the impression; and providing, by the online system, the selected one or more content items for display to the client device associated with the user.

14. The computer program product of claim 13, wherein aggregating the impression comprises:

identifying the one or more other users of the online system, wherein the one or more other users are connected with the individual in the online system.

15. The computer program product of claim 13, wherein aggregating the impression comprises:

identifying the one or more other users of the online system, wherein the user profiles of the one or more other users at least in part match the user profile of the individual.

16. The computer program product of claim 9, further comprising instructions for:

applying the impression associated with the individual to derive information describing attribution of the content item based on the analysis, wherein the attribution of the content items indicates whether the individual is interested in the content item.

17. A computer system comprising:

a processor; and a non-transitory computer readable storage medium having instructions encoded thereon that, when executed by a processor, cause the processor to perform steps including:

receiving, by an online system from a client device, a data set comprising an identifier of an individual associated with the client device, an ambient audio fingerprint representing ambient audio captured by the client device during a broadcast by a household device in a vicinity of the client device, and time information indicating a length of time of the ambient audio captured by the client device;

identifying a user profile associated with the online system based on the identifier of the individual received from the client device;

identifying a content item associated with the broadcast based on the ambient audio fingerprint;

determining that there was an impression of the identified content item by the identified user associated with the client device in response to the length of time of the ambient audio exceeding a detection threshold;

logging the impression of the identified content item in association with the user profile in a data store of the online system;

determining if impression data in the data store exceeds a threshold impression value; and responsive to determining that the impression data in the data store exceeds the threshold impression value, sending an instruction to a content provider to increase broadcasting frequency of the content item on the household device.

18. The computer system of claim 17, wherein the audio feature is high frequency sound that is inaudible to human being and is located at the beginning of the recorded ambient audio.

19. The computer system of claim 17, further comprising instructions for:

updating the user profile based on the logged impression for the individual identified in the data set.

* * * * *